Oct. 24, 1950 P. CARIANI 2,526,994
APPARATUS FOR CLEANING, DEHYDRATING, AND
STORING SEED AND GRANULAR MATERIAL
Filed March 10, 1949 4 Sheets-Sheet 1
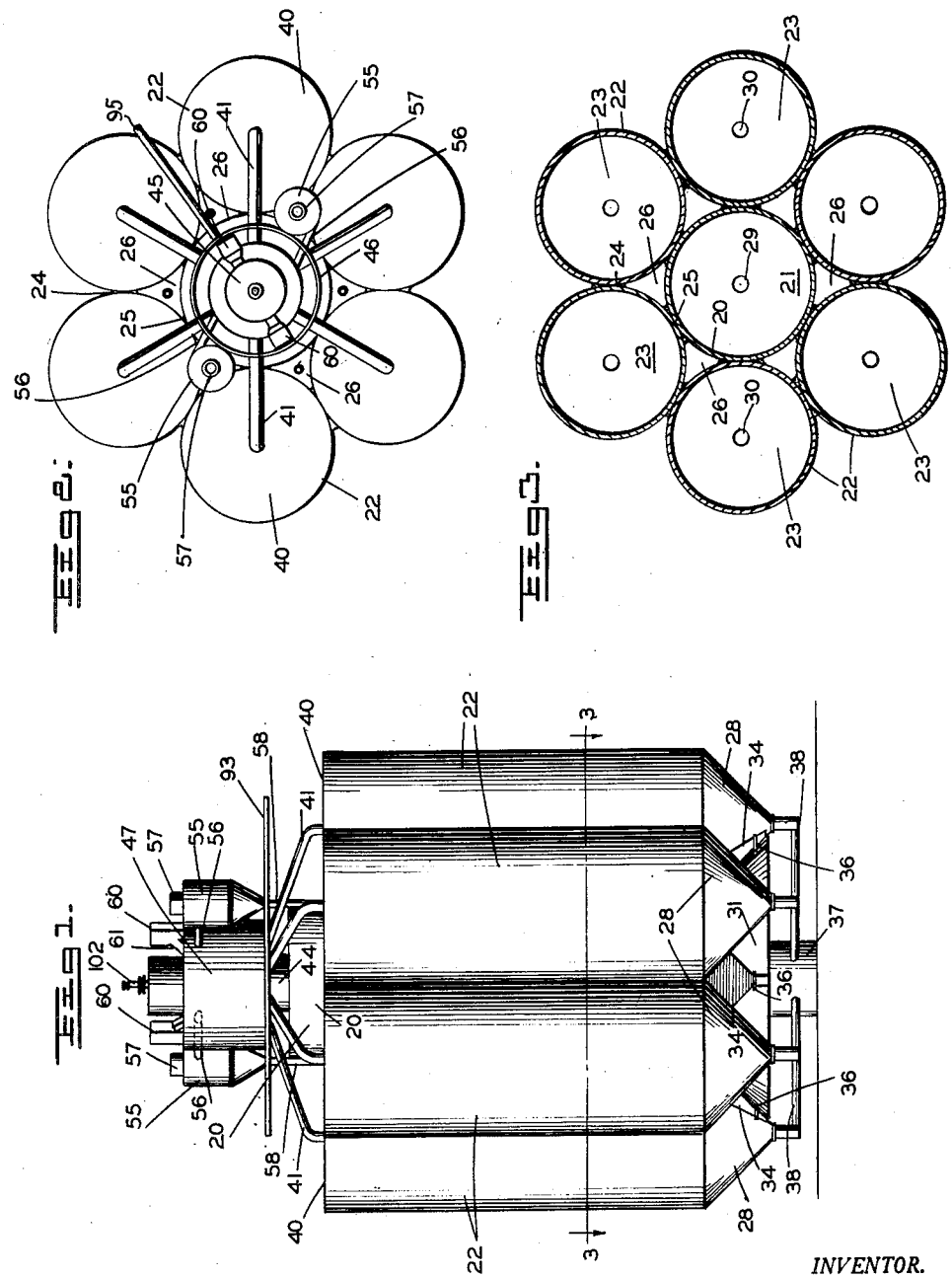
INVENTOR.
PEDRO CARIANI
BY
ATTORNEY

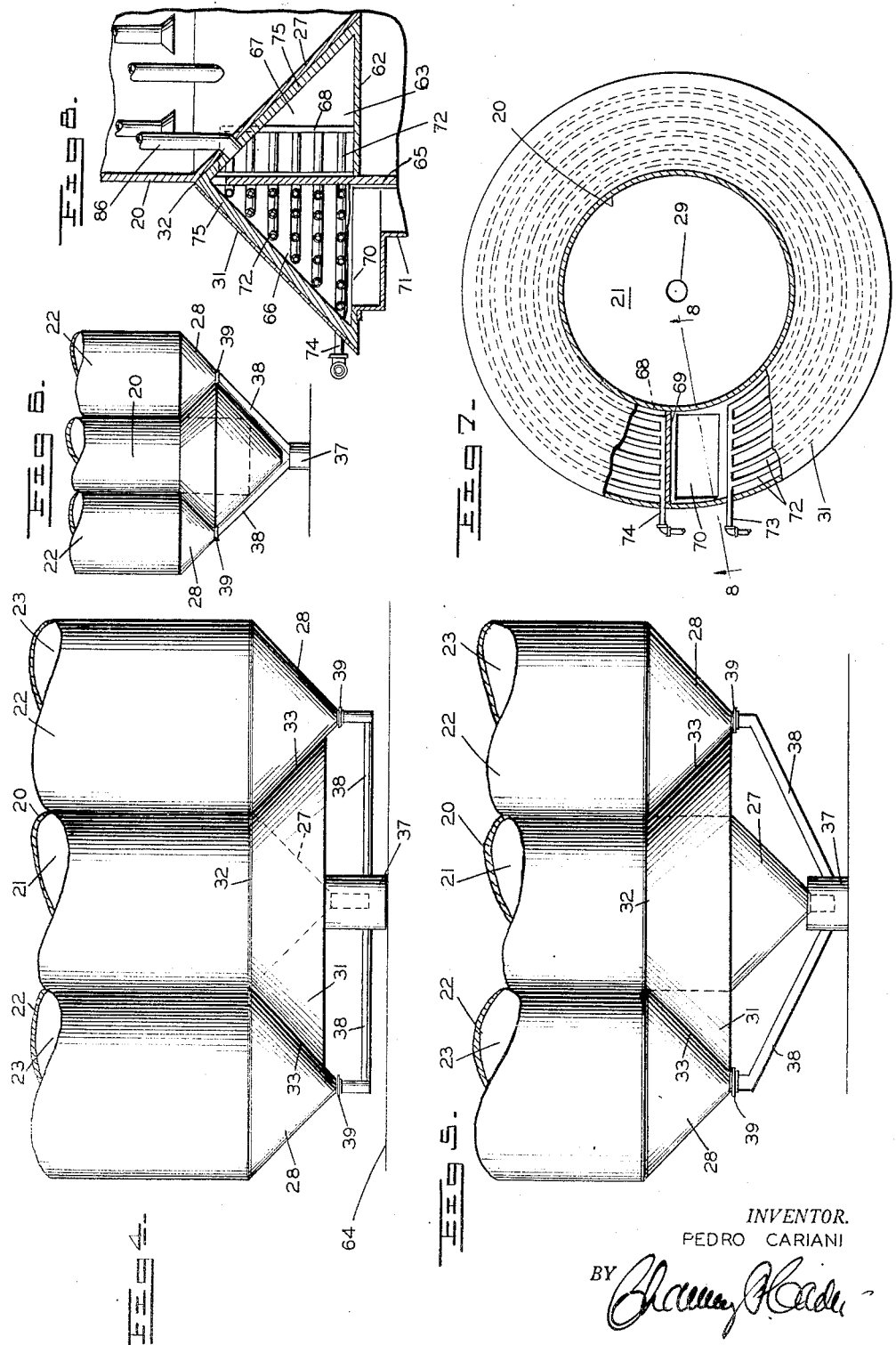

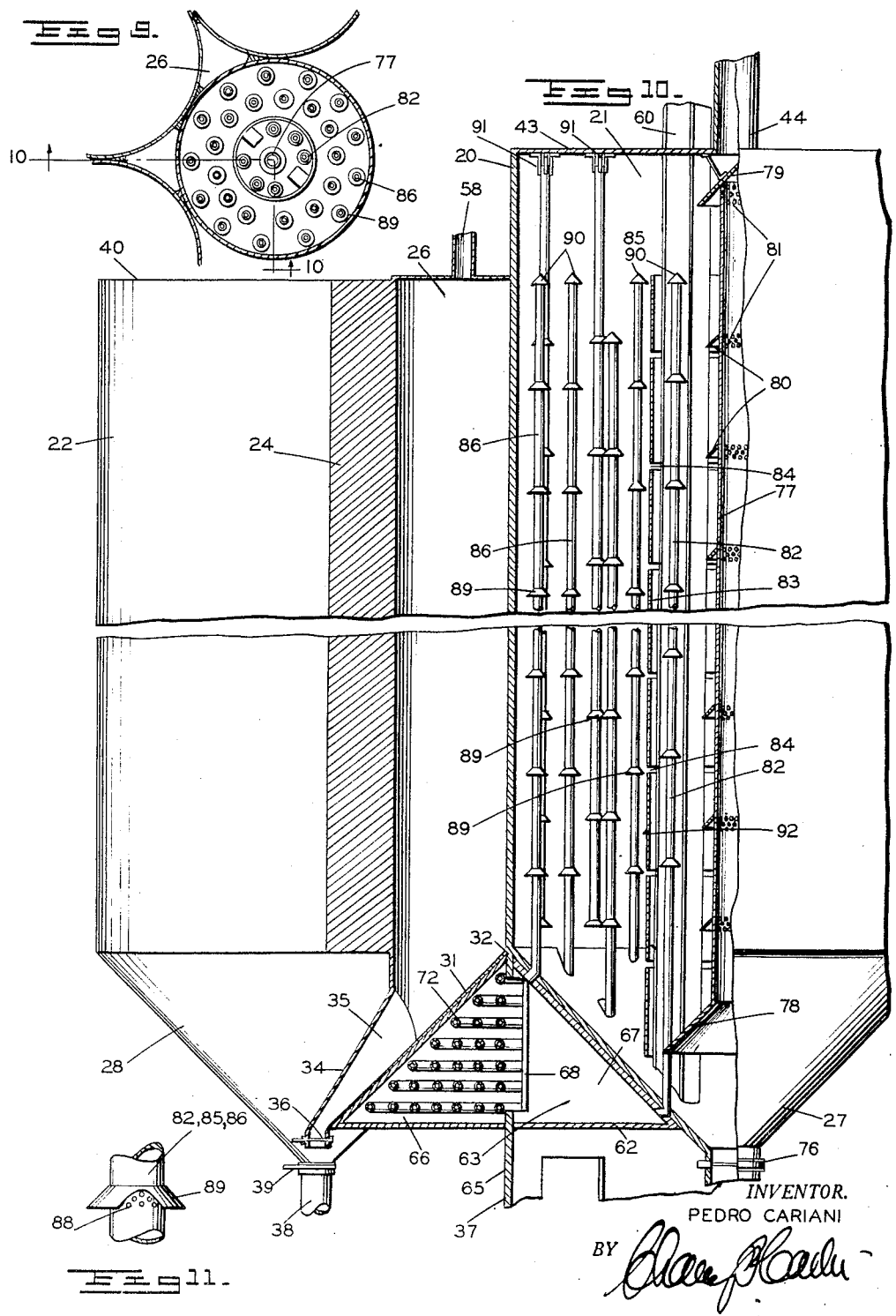

Oct. 24, 1950          P. CARIANI          2,526,994
APPARATUS FOR CLEANING, DEHYDRATING, AND
STORING SEED AND GRANULAR MATERIAL
Filed March 10, 1949          4 Sheets-Sheet 4
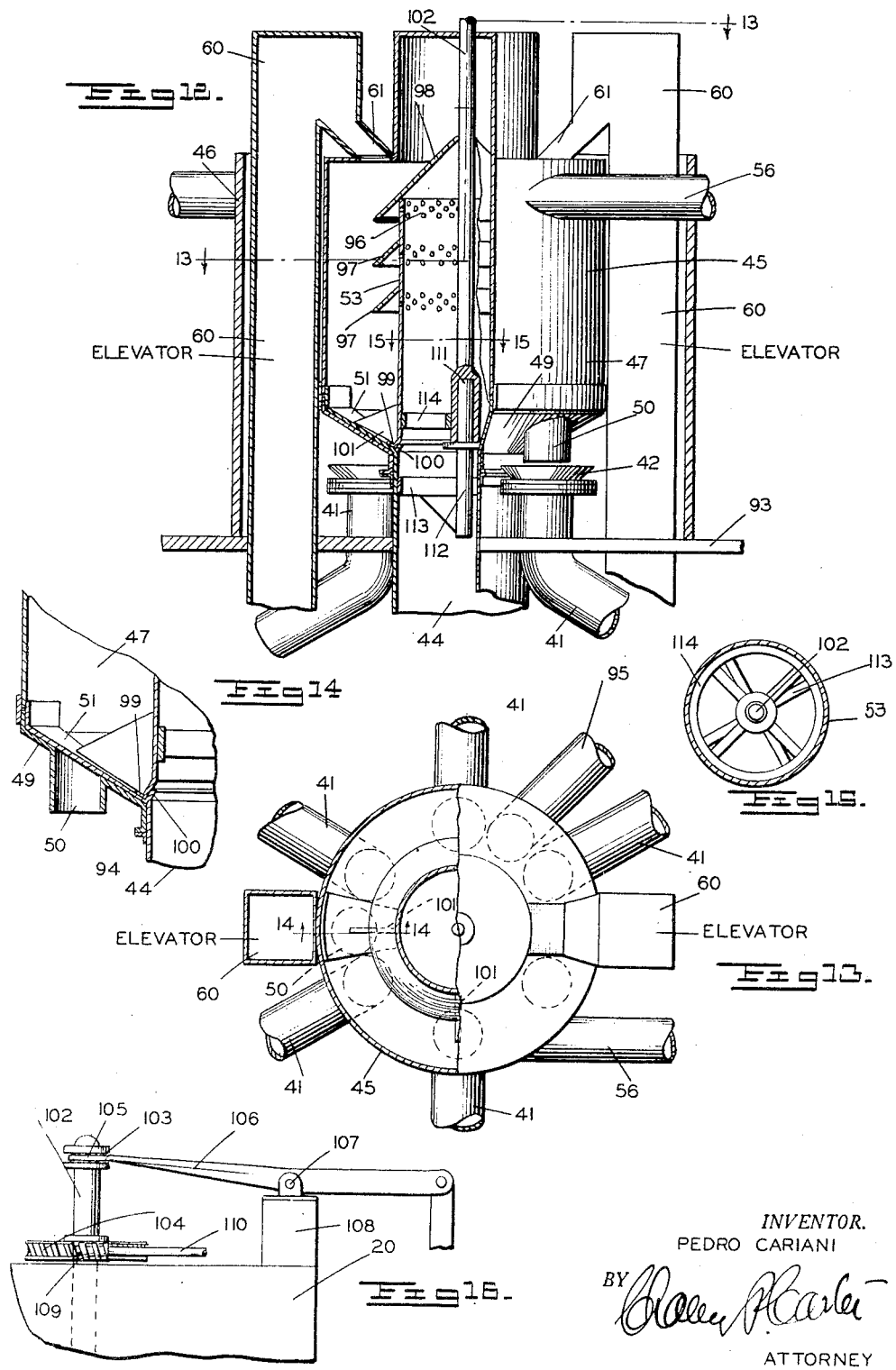
INVENTOR.
PEDRO CARIANI Patented Oct. 24, 1950

2,526,994

UNITED STATES PATENT OFFICE 2,526,994

APPARATUS FOR CLEANING, DEHYDRATING, AND STORING SEED AND GRANULAR MATERIAL

Pedro Cariani, Sao Paulo, Brazil

Application March 10, 1949, Serial No. 80,662
In Brazil March 9, 1948

9 Claims. (Cl. 34—167)

This invention relates to apparatus for the treatment and storage of various kinds of seed and grain, and more particularly to the main elements required for dehydration, separation of chaff and foreign matter, storage of the latter for food or fertilizer, and storage of the treated seed and grain.

While the invention is particularly well adapted for use in tropical climates and/or where the seed or grain arrive for treatment and storage from various regions and have been harvested at different times of the year such as in central Brazil, it is well adapted for use in the more temperate zones and/or where very large quantities of seed or grain are brought for treatment, coming from substantially the same region.

In many localities almost all seed and grain to be dried, which arrive at storage bins or central storage elevators, belong to different batches. That is, they come from different sources or regions and, no matter if they form only one lot, the batches or lot arrive from the fields, plantations or groves for subsequent treatment such as extraction of excess humidity and homogenization of the whole batch during a period of rest. It is important to bear this in mind since the improvements herein disclosed have as one of the principal objects to provide a compact arrangement of units, which may be economically assembled for both treatment and storage, particularly in that they are generally grouped in a cylindrical form.

Another object of the invention is to provide apparatus which may be used with economy and success in regions similar to those of central Brazil, where the most adverse tropical and subtropical climatic conditions exist and where abnormal rotation of many different crops occur, some starting before others end, as for example, beans in January, rice in February and March, beans again in April, May, or June, corn in May and early June, coffee from May up to September and winter wheat not until early September. The lack of heavily cold winters and the abnormally changeable rain season, which extends usually from September until March are, to a large extent, responsible for the absence of regularity of the crop period in the same region. These conditions may also exist in many other sections of the world, but are given as examples to emphasize the importance of this invention to meet adverse climate conditions.

The invention mainly contemplates the erection of a plurality of connected upright cylindrical hollow bodies serving as storage bins, arranged in generally circular plan, about and connected to a centrally located upright cylindrical hollow body in which aeration and dehydration is carried on, the assembly providing relatively smaller chambers of somewhat triangular shaped cross section between the curved walls of the outer cylindrical bodies and the central cylindrical body, suitable for storing chaff which may be used as animal food or as fertilizer, if there is considerable foreign matter carried with it during treatment. These smaller chambers may also be used to house elevators, ladders, pipes for conducting fluids, electrical conduits, etc.

The invention also contemplates the provision of simple and efficient means associated with these cylindrical bodies for heating an up-draft of air in the central body and the distribution of such heated air for treatment of the material flowing downwardly or at rest in the chamber of such body. This distribution of the heated air is preferably accomplished in a manner to permit the treated seed or grain to flow in a rather uniform manner from the central body when it is desired to again elevate it for distribution to one or more of the outer bodies or bins.

Another object is to provide a distributing head at the upper portion of the central cylindrical body whereby material delivered to it may be selectively directed to the central body for treatment, or to any one of the outer bin bodies.

Another object is to provide means for separating the chaff and other foreign matter carried by the stream of air, which has passed through the central body and distributor head, from the air, so that it may be stored and utilized as previously described.

Other objects and advantages of the invention will appear in the following detailed description, taken in connection with the accompanying drawings, forming a part of this specification, and in which drawings:

Fig. 1 is a side elevational view of the apparatus, many details of which shown in other figures having been omitted because they are relatively small, this figure showing the general arrangement of the main units of the apparatus.

Fig. 2 is a top plan view of the apparatus shown in Fig. 1.

Fig. 3 is a horizontal sectional view on the line 3—3 of Fig. 1 with elements of the interior of the cylindrical units omitted.

Figs. 4, 5 and 6 are fragmentary views in elevation, somewhat diagrammatically representing the different arrangements of units at the lower portions of the apparatus.

Fig. 7 is a view partly in plan and partly in horizontal section of a portion of the apparatus particularly well adapted to heat air traveling as an updraft through the central body of the apparatus.

Fig. 8 is an enlarged sectional view through the same substantially on the line 8—8 of Fig. 7.

Fig. 9 is a horizontal sectional view through the central cylindrical body and portions of adjacent cylindrical bodies, showing the preferred arrangement of air conducting tubes in the central body.

Fig. 10 is an enlarged vertical sectional view on substantially the line 10—10 of Fig. 9.

Fig. 11 is a fragmentary view on an enlarged scale, in side elevation of one of the air tubes, a portion of a deflector associated therewith being partly broken away to disclose details.

Fig. 12 is a detail view partly in elevation and partly in section of the upper portion of the apparatus above the central cylindrical body.

Fig. 13 is a fragmentary view partly in horizontal sectional view and partly in plan on substantially the line 13—13 of Fig. 12.

Fig. 14 is an enlarged, fragmentary vertical sectional view on the line 14—14 of Fig. 13.

Fig. 15 is a horizontal sectional view on the line 15—15 of Fig. 12.

Fig. 16 is a side elevation of mechanism at the extreme upper portion of the apparatus for imparting vertical and circumferential movement to parts of the apparatus shown in Fig. 12.

In order to simplify the disclosure many devices and accessories common in the art have been omitted from the drawings, such as columns and other supports for sustaining units of the apparatus; heaters; motors; fans; conveyor parts; stairs; service platforms; combustion and temperature control and recording devices, etc.

As illustrated, the equipment includes a first upright cylindrical hollow body 20 providing a chamber 21 for receiving the material acted upon, and a plurality of second upright cylindrical hollow bodies 22 providing chambers 23 serving as bins for the storage of material after treatment. The bodies 22 are arranged in generally circular fashion around the central body 20 and are joined tangentially to each other and to the central body 20 as at 24 and 25 respectively, providing a plurality of chambers 26 of polygonal or substantially triangular cross section, as shown in Fig. 3.

These cylindrical bodies 20 and 22 preferably have inverted frusto-conical bottoms 27 and 28, provided with exit or discharge openings 29 and 30, respectively, and to act as partial bottoms for the cavities 26 a frusto-conical member 31 is provided encircling the body 20, as at 32 and connected tangentially as at 33 to the bottoms 28 of the bodies 22 as shown in Figs. 4 and 5. Segmental walls 34, shown in Figs. 1 and 10 may be provided between selected bottoms 28 of cylindrical bodies 22 to cooperate with the member 31 to provide spout-like ways 35 such as is shown in Fig. 10, for egress of material from the chambers 26 thereabove, and these ways 35 may be controlled by valves 36.

In the center, below the central body 20 is located a housing 37 into which conduits 38 leading from the openings 30 converge, valves 39 for controlling egress from the bodies 22 being preferably provided at the openings 30.

At the upper part of each cylindrical body 22 a top 40 is provided having a material conveying duct 41 having a material receiving hopper opening 42, shown in Fig. 12, preferably located above cylindrical body 20, and spaced equidistant radially from the axis of said body. From top 43 of body 20, leads a coaxial, upstanding inlet tubular extension 44 shown in Figs. 1, 10 and 12. Above the extension 44 is located a distributing assembly 45, preferably comprising an outer cylindrical shell 46; an inner cylindrical distributing head 47, coaxial with the tubular extension 44; a rotatably mounted bottom 49, between the lower portion of head 47 and tubular extension 44, provided with an outlet spout 50; a shutter 51 for spout 50; and a vertically and circumferentially movable control tube 53 coaxial with tubular extension 44, all to be subsequently described more in detail.

There is also provided one or more aero-separators 55 having a duct 56 leading thereto from the upper portion of the distributing head 47, an air outlet 57, and a duct 58 leading from the lower portion of the separator 55 to a selected chamber 26 between bodies 20 and 22, for delivery of solids thereinto.

Material in housing 37 may be delivered into the distributing head 47 by one or more elevators 60 of any suitable type extending upwardly through the body 20, through the top wall 43, exteriorly of the distributing head 47, and having its delivery end 61 open to the upper portion of the distributing head.

Thus the above assembled group of elements as described and illustrated, provides the central cylindrical body 20, provided with chamber 21 in which are disposed some of the essential elements for dehydration, and the chambers of cylindrical bodies 22 are for rest or homogenization. In the distributing assembly 45 are embodied elements for distribution to each of the bins 22 and also the elements which assist during the transport or grain motion, the separation of all light solid bodies, such as chaff, hull fragments, dust, insects or any foreign matter from the seed or grain. Such light solid bodies are taken up by an adequate air draft into the aero-separators 55 and stored into the selected chambers 26 not only in order to protect the neighborhood against dust and undesirable matter, but also in order to have it available as a fertilizer, or feed, according to its composition. With respect to the chambers 26, some of them may have different uses, for instance, galleries for gas or air pipes, location of vertical grain elevators or personal elevators.

By the use of the frusto-conical member 31, the conical bottom, or the wall of body 20, and a bottom wall 62, a ring-like chamber 63 is provided which is very useful as hereinafter described.

In Figs. 4, 5 and 6 are shown somewhat diagrammatic illustrations of three different ways to provide the ring-shaped or annular chamber 63. It must be kept in mind that free access must be had to the housing 37, the valves 36 and 39 to the elevators or conveyors, and for repair or cleaning. It must also be remembered that local factors bear an influence on the location of such a ring-like chamber, as well as different sizes of equipment.

In Fig. 4, the bottoms 27 and 28 are the same height from the surface 64 and high enough to reach the valves 39 and readily gain access to the housing 37, etc. In this form the ring-like chamber is of triangular cross-section as detailed in the example shown in Fig. 7.

In Fig. 5 is shown the contour lines of such a ring-like chamber limited as in Fig. 4, by the contour of the bottoms 28 of bodies 22, but surrounding the cylindrical central body 20 because in this example the bottoms 28 of bodies 22 are high enough to let the grain flow by gravity down from the gates or valves 39 to the pit of the elevator 60 through inclined ducts 38. This example, as well as that of Fig. 4, is a suitable design for small or medium size apparatus.

In Fig. 6 is shown, on a small scale, a suitable arrangement where more than one ring-like chamber may surround the central cylindrical body 20 at its lower portion.

The particular utility of the ring-like chamber is as a means for distributing air to elements which are contained in the central chamber 21 as hereinafter described. Of course, according to its dimensions and the nature of the equipment for heating of air, a part of the ring-like chamber may be adapted to contain such elements as are shown, for example, in Figs. 7 and 8.

In this example only one-half of the ring-like chamber's cross section is shown in Fig. 7. As there shown one inclined wall of the chamber is the frusto-conical member 31, another inclined wall is the inverted frusto-conical bottom 27 of body 20, and the bottom 62 serves to define the ring-like chamber. A vertical wall 65 which may be vertically aligned with the wall of cylindrical body 20 divides the annular chamber 63 into two concentric ring-shaped chambers 66 and 67 communicating at an opening 68. A vertical radially disposed wall 69 divides the ring-shaped chamber 66 to one side of opening 68 and there is in the bottom 62 an opening 70, to which an air duct 71 is connected. Inside this ring-shaped chamber 66 are installed the necessary arcuate steam pipes 72, connected to intake header 73 and outlet header 74, to adequately heat the updraft of air in chamber 21. This draft of air coming in through opening 70 circulates inside and along the ring-shaped chamber 67, in contact with the pipes 72 and then, through opening 68, deflects into the ring-shaped chamber 68.

In order to have large volumes of heated air, an increased number of openings, not shown in the drawings, may be provided in the bottom 62, like opening 70, as well as the corresponding exhaust openings 68. When heat is to be used all chambers or air ducts generally have their walls protected by heat insulating materials such as indicated at 75 in Fig. 7.

In Figs. 9 and 10 is disclosed the preferred arrangement of tubes and accessories for conducting heated air through the central body 20 and for controlling downward flow of the material treated when a gate or valve 76 at the lower portion of the body is open. As there shown it is preferred to provide an axial tube 77 of relative large diameter having a frusto-conical base 78 spaced above the inner face of body bottom 27, a conical cap 79 at its upper end, and a plurality of vertically spaced deflectors 80 surrounding and overhanging groups of perforations 81. Next, around the tube 77, is a series of smaller tubes 82, the lower ends of which are in communication with the ring-like chamber 63. Surrounding the series of tubes 82 it is then preferred to dispose a cylindrical curtain wall 83 which is spaced from the bottom 27 and from the top wall 43 of body 20, this curtain wall being provided with lateral passageways 84 for air and material to facilitate exit of material through the discharge opening of body 20 when the valve 76 is open. Finally grouped around the exterior of curtain wall 83 are two series of tubes 85 and 86 which may have the same diameter as tubes 82, however the tubes 85 are relatively longer than tubes 86. The tubes 85 and 86 have their lower ends in communication with the ring-like chamber 63 so as to conduct heated air therefrom. The tubes 82, 85 and 86, each have groups of perforations 88 surrounded by overhanging deflectors 89. The tubes 82 and 86 also have conical caps 90 since they are spaced a considerable distance below the top wall 43, but the longer tubes 85 may be provided with slits 91 and extend in close proximity to wall 43 and require no such caps.

In effect the curtain wall 83 divides the chamber 21 into two zones; one containing the tubes 77 and 82, and the other, the tubes 85 and 86. These various tubes perform the purpose of air conveyance and even distribution through the interstices of the grain or seed subjected to treatment, and the air finds exit from chamber 21 through the tubular extension 44. The curtain wall 83 acts as an attritus resistance surface, at the core of the grain column, to the downflowing grain when unloading; this obviates the otherwise natural formation of an inverted cone downflow. As a matter of fact while the column of seed or grain, which is filling the space between that central wall 83 and the external wall 92 of the cylindrical chamber 21 flows down, it has a marked tendency to acquire a higher speed than that where the grain is near and in contact with the wall 92. That downward flow is evident along a line at distances in proportion to the ratio between the areas of the two contact surfaces 83 and 92. Hence, a line of maximum flow speed, downwards along the axis of the cylindrical chamber would occur if the curtain wall 83 did not exist.

Referring now to the distributing assembly 45, shown more in detail in Figs. 12–16, it is preferably located above a platform 93 or other suitable supporting means. The elevators 60 are preferably located between the shell 46 and the distributing head 47, and deliver the material to be acted upon, or treated grain to the cavity of this head 47. The bottom 49 of head 47 is of inverted frusto-conical shape rotatably supported on a collar 94 carried by the tubular extension 44 of the body 20. This bottom 49 may be mechanically rotated or moved by hand, to dispose its spout 50 above any one of the hopper openings 42 or above the hopper opening of an unloading tube 95 which may extend downwardly outside the assembly of bodies 22 for delivery of the treated material into a conveyance such as a truck, not shown in the drawings.

The shutter 51 for spout 50 may be a segment of rigid material secured to the head 47 and the tubular extension 44, the segment being of a width to cover the opening in the bottom 49 as shown in Figs. 13 and 14, when the bottom has been rotated to so position. This shutter prevents egress of material in the distributing head, through the spout, when it is desired to deliver the material to the cavity 21 of body 20.

The control tube 53 serves several purposes. One is to provide an exit for air from tubular extension 44 and with this end in view, the tube 53 is provided with several spaced series of perforations 96 encircled by overhanging deflectors 97, the tube also being provided with a conical cap 98. The control tube also functions as a valve, its lower portion preferably having a small outwardly flared skirt 99 for engagement with an outwardly flared seat 100 formed on the upper end of tubular extension 44. By lifting the control tube 53 material may slide on the bottom 49 into the tubular extension 44 and into chamber 21. The control tube may also function to scoop accumulated material on the bottom 49 into the spout 50 by means of a plurality of scrapers 101 extending radially from the lower exterior portion of tube 53, the scrapers shaped to traverse in close proximity the upper surface of the bottom 49 as the tube is rotated and while seated on the seat 100.

For moving the control tube 53 vertically or circumferentially, it may be provided with an axial shaft 102, the upper end of which is provided with a grooved ring 103 and a worm wheel 104, a shown in Fig. 16, the ring 103 receiving the forked end 105 of a lever 106 pivoted as at 107 and operated from any suitable point through link 108 and the worm wheel 104 being rotated by worm 109 mounted on a shaft 110. Any suitable means may, however, be provided for reciprocating and rotating the control tube 53. The shaft 102 may be secured to the apex portion of cap 98, and at its lower portion may be provided with a socket portion 111 telescoping on an upstanding pin 112 carried by a spider 113 carried by the tubular extension 44. A second spider 114 may be secured to the inner lower portion of the control tube 53 and to the socket portion 111 of shaft 102, as shown in Figs. 12-15.

While the operation of the apparatus will be clear from the foregoing description it is pointed out that one of the elevators 60 may be used to elevate material to be treated from the housing 37 to the distributing assembly 45 to be spread by cap 98 of the control tube 53 in the distributing head 47 and subjected to blasts of air which carry off the chaff, etc. to the separators 55. During the operation the control tube 53 is in a raised position and the spout opening of bottom 49 is closed by shutter 51. The other elevator 60 may be used to transfer treated material in housing 37 to the distributing assembly 45, and then to the cavity of the selected bin 22 at which time the control tube is lowered to a seating position and the bottom 49 has been moved to a position with its spout 50 out of the zone of shutter 51 and over the desired hopper opening 40 of the selected bin, or treated material may be delivered to the unloading tube 95, as previously described.

1. In apparatus of the character described, the combination of a first upright cylindrical hollow body providing a chamber for receiving the material to be acted upon, said body provided with a material receiving opening at its upper portion and an inverted frusto-conical bottom providing a discharge opening at its bottom for the material acted upon; a plurality of second upright cylindrical hollow bodies providing separate chambers for storage of material, said second bodies arranged about said first body joined to the latter and to each other, providing chambers polygonal cross section between the first body and second bodies, said second bodies each provided with a material receiving opening at its upper portions, and an inverted frusto-conical bottom providing a discharge opening; and means comprising a frusto-conical member encircling said first body at its lower portion and connected tangentially to said inverted frusto-conical bottoms of said second bodies, to provide bottoms for said chambers of polygonal cross section, and a bottom for said frusto-conical member providing therewith a ring-shaped chamber under the chambers of said second bodies and said chambers of polygonal cross section.

2. In apparatus of the character described, the combination of a first upright cylindrical hollow body providing a chamber for receiving the material to be acted upon, said body provided with a material receiving opening at its upper portion and an inverted frusto-conical bottom providing a discharge opening at its bottom for the material acted upon; a plurality of second upright cylindrical hollow bodies providing separate chambers for storage of material, said second bodies arranged about said first body, joined to the latter and to each other, providing chambers of polygonal cross section between the first body and second bodies, said second bodies each provided with a material receiving opening at its upper portion, and an inverted frusto-conical bottom providing a discharge opening; means comprising a frusto-conical member encircling said first body at its lower portion and connected tangentially to said inverted frusto-conical bottoms of said second bodies, to provide bottoms for said chambers of polygonal cross section, and a bottom for said frusto-conical member providing therewith a ring-shaped chamber under the chambers of said second bodies and said chambers of polygonal cross section, said last mentioned bottom provided with an opening for ingress of air to the ring-like chamber, and said last mentioned chamber communicating with said chamber of the first body for passage of air thereinto; and means for heating the air passing through said ring-like chamber.

3. In apparatus of the character described, the combination of an upright cylindrical body providing a chamber for receiving the material to be acted upon said body provided with a top wall having a material receiving opening, and a discharge opening at its lower portion; means providing a ring-like chamber about the bottom portion of said body, with an inlet opening for air to the ring-like chamber; means in said ring-like chamber for heating the air which enters the same; a first and a second set of vertical tubes in said first mentioned chamber in communication with said ring-like chamber for conducting air therefrom, said tubes each provided with exit openings spaced apart circumferentially of the tube, and in spaced apart groups; frusto-conical deflectors surrounding each of said tubes above each group of exit openings therein; and a conical cap on the upper end of each tube of said first set of tubes, the ends of the tubes of said second set of tubes being open and located in a plane above the deflectors of the tubes of said first set of tubes and adjacent to the said top wall of said body.

4. In apparatus of the character described, the combination of an upright cylindrical body providing a chamber for receiving the material to be acted upon, said body provided with a top wall having a material receiving opening, and an inverted frusto-conical bottom providing a discharge opening; means providing a ring-like chamber about said body bottom, with an inlet opening for air to said ring-like chamber; means in said ring-like chamber for heating the air which enters the same; an axial tube, of relatively large diameter, in said cylindrical body, provided with a frusto-conical bottom spaced from the inner surface of the bottom of said cylindrical body, and a conical top adjacent to but below the material receiving opening of the top wall of said upright body; a first and a second set of relatively smaller upright tubes grouped about said first mentioned tube, said sets of smaller upright tubes in communication with said ring-like chamber for conducting air therefrom, said tubes each provided with exit openings spaced apart circumferentially of the tube, and in spaced apart groups; frusto-conical deflectors surrounding each of said tubes above each group of exit openings therein; and a conical cap on the upper end of each tube of said first set of tubes, the ends of the tubes of said second set of tubes being open and located in a plane above the deflectors of the tubes of said first set of tubes and adjacent to the said top wall of said body.

5. In apparatus of the character described, the combination of an upright cylindrical body providing a chamber for receiving the material to be acted upon, said body provided with a top wall having a material receiving opening, and an inverted frusto-conical bottom providing a discharge opening; means providing a ring-like chamber about said body bottom, with an inlet opening for air to said ring-like chamber; means in said ring-like chamber for heating the air which enters the same; an axial tube, of relatively large diameter, in said cylindrical body, provided with a frusto-conical bottom spaced from the inner surface of the bottom of said cylindrical body, and a conical top adjacent to but below the material receiving opening of the top wall of said upright body; a first and a second set of relatively smaller upright tubes grouped about said first mentioned tube, said sets of smaller upright tubes in communication with said ring-like chamber for conducting air therefrom, said tubes each provided with exit openings spaced apart circumferentially of the tube, and in spaced apart groups; frusto-conical deflectors surrounding each of said tubes above each group of exit openings therein; a conical cap on the upper end of each tube of said first set of tubes, the ends of the tubes of said second set of tubes being open and located in a plane above the deflectors of the tubes of said first set of tubes and adjacent to the said top wall of said body; and a cylindrical curtain wall axially disposed in said upright cylindrical body between said tube of relatively large diameter and at least some of said tubes of relatively smaller diameter, said curtain wall spaced from the bottom and top wall of the chamber of said cylindrical body, and provided with lateral passageways for air and material acted upon in said last mentioned chamber to facilitate exit of the material through said discharge opening.

6. In apparatus of the character described, the combination of a first upright cylindrical hollow body providing a chamber for receiving the material to be acted upon; a top wall for said cylindrical body provided with an upwardly projecting, axial tubular extension; a plurality of second upright hollow bodies providing chambers for storage of grain, said second bodies located laterally of said first body and provided with tops having inlet openings spaced equidistant from the axis of said first body; a cylindrical distributing head located above and coaxial with said tubular extension; an inverted frusto-conical bottom rotatably mounted between the lower portion of said distributing head and said tubular extension, said frusto-conical bottom provided with a spout which may be placed in communication with any one of the inlet openings of said second bodies by rotation of said frusto-conical bottom; and a shutter for said spout.

7. In apparatus of the character described, the combination of a first upright cylindrical hollow body providing a chamber for receiving the material to be acted upon; a top wall for said cylindrical body provided with an upwardly projecting, axial tubular extension; a plurality of second upright hollow bodies providing chambers for storage of grain, said second bodies located laterally of said first body and provided with tops having inlet openings spaced equidistant from the axis of said first body; a cylindrical distributing head located above and coaxial with said tubular extension; an inverted frusto-conical bottom rotatably mounted between the lower portion of said distributing head and said tubular extension, said frusto-conical bottom provided with a spout which may be placed in communication with any one of the inlet openings of said second bodies by rotation of said frusto-conical bottom; a shutter for said spout; and a vertically movable control tube, coaxial with said tubular extension of the top wall of said first body constructed and arranged, when in a lowered position, to close off passage of grain from said distributing head to the tubular extension of said first body and, when in an elevated position to permit material to be acted upon to pass from the distributing head through said tubular extension into said first body.

8. In an apparatus of the character described, the combination of a first upright cylindrical hollow body providing a chamber for receiving the material to be acted upon; a top wall for said cylindrical body provided with an upwardly projecting, axial tubular extension; a plurality of second upright hollow bodies providing chambers for storage of grain, said second bodies located laterally of said first body and provided with tops having inlet openngs spaced equidistant from the axis of said first body; a cylindrical distributing head located above and coaxial with said tubular extension; an inverted frusto-conical bottom rotatably mounted between the lower portion of said distributing head and said tubular extension, said frusto-conical bottom provided with a spout which may be placed in communication with any one of the inlet openings of said second bodies by rotation of said frusto-conical bottom; a shutter for said spout; a vertically and circumferentially movable control tube, coaxial with said tubular extension of the top wall of said first body constructed and arranged, when in a lowered position, to close off passage of grain from said distributing head to the tubular extension of said first body and, when in an elevated position to permit material to be acted upon to pass from the distributing head through said tubular extension into said first body; and scrapers carried by the lower exterior portion of said control tube constructed and arranged to traverse the upper face of said inverted frusto-conical bottom when the control is lowered and rotating, for moving grain to the said spout of said bottom.

9. In apparatus of the character described, the combination of a first upright cylindrical hollow body providing a chamber for receiving the material to be acted upon; a plurality of second upright cylindrical hollow bodies providing separate chambers for storage of material, said second bodies arranged about said first body, joined to the latter and to each other, providing chambers of polygonal cross section between the first body and second bodies, said chambers of the first and second bodies provided with material receiving openings at their upper portions, and discharge openings at their lower portions; means in said first body for dehydration of the material therein augmented by an up-draft of air in the chamber; a distributor head on said first body constructed and arranged to selectively deliver material to be acted upon to the chamber of said first body or grain to any chamber of said second bodies, and to receive the up-draft of air from the chamber of said first body; and an aero-separator receiving chaff and foreign matter carried by the up-draft of air in said distributor head and delivering the chaff and foreign matter to a selected one of said chambers of polygonal cross section.

PEDRO CARIANI.

REFERENCES CITED

The following references are of record in the file of this patent:

UNITED STATES PATENTS

| Number | Name | Date |
|---|---|---|
| 79,699 | Standing | July 7, 1868 |
| 329,422 | Wolcott | Oct. 27, 1885 |
| 633,221 | Sorlle et al. | Sept. 19, 1899 |
| 1,251,573 | Provost | Jan. 1, 1918 |